W. ENRIGHT.
VEHICLE WHEEL.
APPLICATION FILED DEC. 21, 1907.

1,007,436.

Patented Oct. 31, 1911.

Witnesses

Inventor
William Enright
By Parker & Burton
Attorneys

UNITED STATES PATENT OFFICE.

WILLIAM ENRIGHT, OF DETROIT, MICHIGAN.

VEHICLE-WHEEL.

1,007,436.   Specification of Letters Patent.   Patented Oct. 31, 1911.

Application filed December 21, 1907. Serial No. 407,578.

*To all whom it may concern:*

Be it known that I, WILLIAM ENRIGHT, a citizen of the United States, residing at Detroit, county of Wayne, State of Michigan, have invented a certain new and useful Improvement in Vehicle-Wheels, and declare the following to be a full, clear, and exact description of the same, such as will enable others skilled in the art to which it pertains to make and use the same, reference being had to the accompanying drawings, which form a part of this specification.

My invention relates to vehicle wheels, and the object of my improvements is to secure an improved wheel having a resilient tire.

Figure 1:
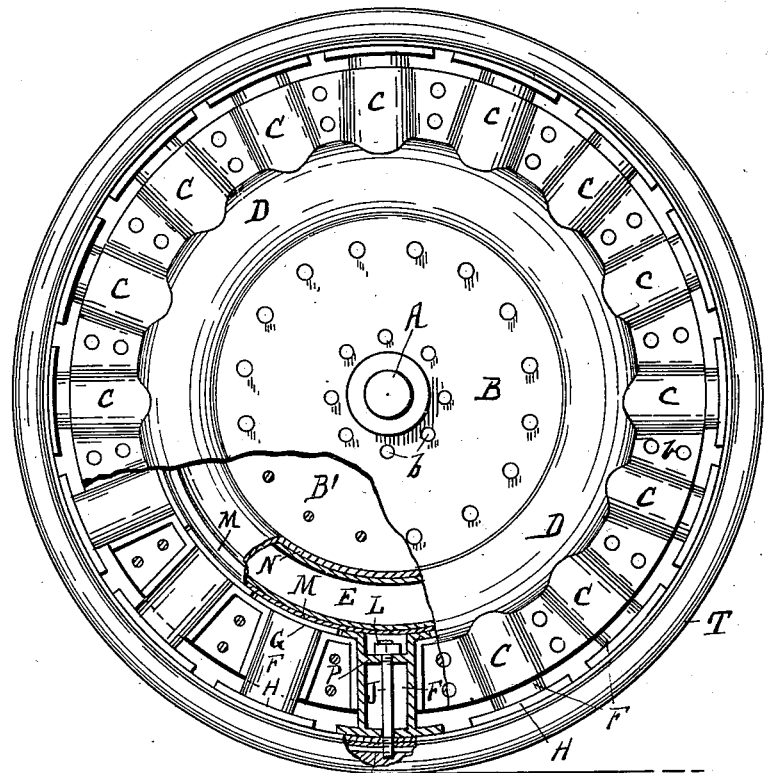
Figure 2:
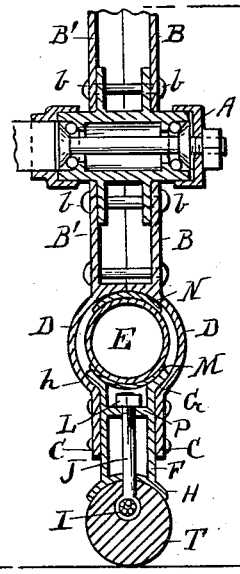
Figure 3:
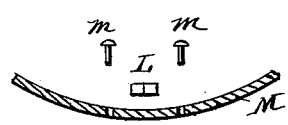
Figure 3:
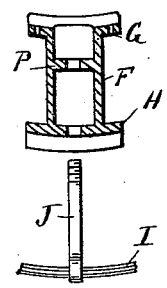

In the accompanying drawings,—Figure 1, is an elevation of the wheel embodying my invention, a portion of the front plate being cut away and some parts being shown in section. Fig. 2, is a section through the center of the wheel at right angles to its plane. Fig. 3, is a detail view of detached parts to illustrate the construction.

I form the main portion of the wheel of two plates, B, and B', joined by bolts or rivets $b$; these plates are preferably formed of sheet metal, and are secured to the hub A, by bolts or rivets, as indicated in Fig. 2. Concentric with each of said plates is formed an annular portion D, semi-circular in cross section. When the plates are joined together, these two annular portions form an annular tube, as indicated in Fig. 2.

C, are semi-cylindrical, radially extending portions of the plates B, B', which extend from the annular portions D, so that when the plates are secured together the pairs of adjacent semi-cylindrical parts C, form radially extending cylinders or tubes, as indicated in Figs. 1 and 2. Between the two parts is placed a resilient pneumatic tube, E, and around the outer and inner edge of said tubes are placed flexible strips of leather, or other suitable material, M, N.

F, is a tube fitting and adapted to slide in each of the cylinders formed by adjacent parts, C, C.

H, is an extended head at one end of a tube F, and G, is an extended head at the other end of said tube. The head G, rests against the strip M, and is supported by the pneumatic tube E, and held at the outer end of its travel by the resiliency of said tube.

P, is a partition in the tube F.

T, is a tire extending around the periphery of the wheel, its inner portion resting upon heads H of the tubes F.

I, is a wire, or bundle of wires, or other suitable devices, extending parallel with the longitudinal axis of the tire T and embedded therein.

J, is a rod having an eye at its outer end, and screw threaded at its inner end. The wires I, pass through the eyes of the bolts J, and the inner end of each of said bolts passes through the partition P, and is secured in place by a nut L, screwed upon the end of said bolt, and against the partition P, to hold the tire T, in place, and to hold each of the tubes F, firmly against the tire. The strip M, is secured to the head G, by rivets, $m, m$ (Fig. 3).

The operation of the above described device is as follows: The tire being secured in place, air is forced into the tube E, to expand the same and force the tubes F, toward or to the outer end of their travel, thus tightening and extending the tire T. As the wheel rolls the tire T, is flattened or forced out of its circular form locally, each of the tubes F, yielding, and when it is passed the pressure point returning the tire to its normal shape, the inflated tube E, permitting this resilient action.

What I claim is:

The combination of the disks B, B', having the annular portions D, D, semi-circular in cross section forming an annular tube, and the radial portions C, C, means for securing said disks together so that the portions C, C, register forming radially extended cylinders, a resilient tube E between the portions D, D, a tube F, adapted to reciprocate in each of the cylinders C, C, a partition P, in the tube F, a resilient tire extending around the outside of the above mentioned elements and held in extended position by the tubes F, a rod J, secured at its outer end to said tire and at its inner end passing through a hole in said partition, and a nut L upon the said rod, substantially as described.

In testimony whereof, I sign this specification in the presence of two witnesses.

WILLIAM ENRIGHT.

Witnesses:
 VIRGINIA C. SPRATT,
 ELLIOTT J. STODDARD.

Copies of this patent may be obtained for five cents each, by addressing the "Commissioner of Patents, Washington, D. C."